UNITED STATES PATENT OFFICE 1,941,507

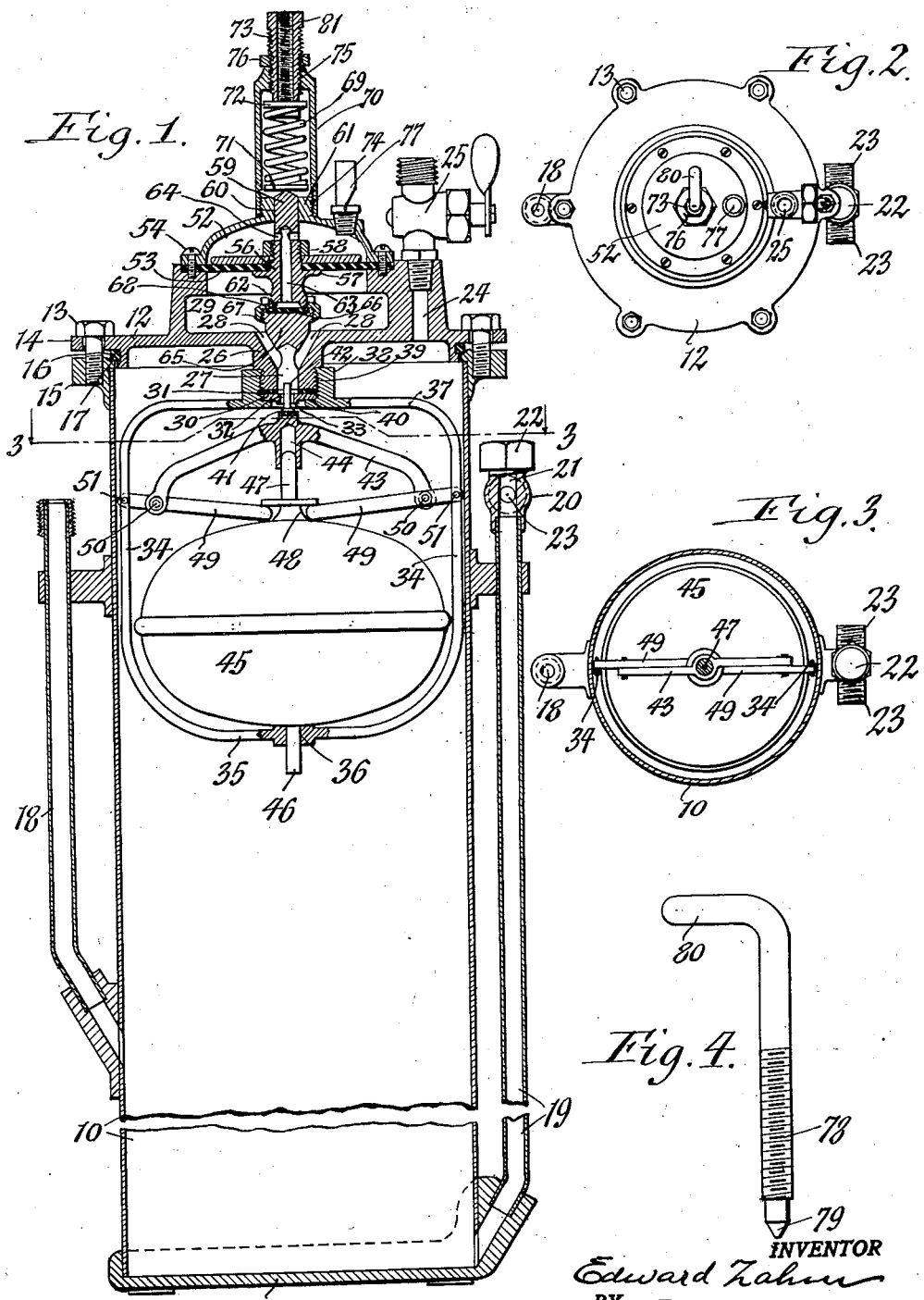

TAPPING APPARATUS

Edward Zahm, Buffalo, N. Y., assignor to Zahm & Nagel Co. Inc., Buffalo, N. Y., a corporation of New York Application July 22, 1932. Serial No. 624,040

3 Claims. (Cl. 225—8)

This invention relates to a tapping or dispensing apparatus which is more particularly intended for dispensing beer or other liquids containing a gas in solution and in which the liquid is transferred under gas pressure from a main container, and first passed through a cooling apparatus, and then delivered through a dispensing faucet for consumption.

In the system heretofore in use the beer is drawn from a wooden container directly to the dispensing faucet through block tin coil immersed in water which is cooled by means of cracked ice placed in the water or in the more modern units cooled by mechanical refrigeration of the water through which the coil passes.

Usually the beer in the wooden container is warm and requires considerable cooling to bring it to a temperature at which it is to be drunk. A pressure of air or carbonic acid gas (preferably the latter) is placed on the beer container, this pressure being such as will deliver the beer through the coil to the dispensing faucet properly. This pressure varies according to the location of the container and is obviously higher when the container is below the level of the faucet to overcome the hydrostatic head caused by the difference in elevation.

In a coil having inside diameter of ⅜ in. which is the size most generally in use for this purpose a forty foot coil when filled with beer contains less than one quart of beer which is subjected to the cooling action of the surrounding ice water or water mechanically cooled. This quantity of beer in this coil cools rapidly and if the coil chamber is well iced the temperature to which the beer in the coil is cooled is below that desirable for drinking. Therefore, the first few glasses which are drawn are too cold for consumption and after the quart of beer which the coil holds has been drawn into glasses the succeeding glasses of beer which come directly from the wooden container do not have an exposure in the coil for a sufficient length of time to bring the beer to the desired temperature and are consequently too warm for consumption. Another factor enters during this operation, namely: the release of carbonic acid gas from the beer. The beer which has been in the coil for a time to cool to a low temperature under pressure (to which it is subjected while the faucet is closed) has the carbonic acid gas in solution and when drawn at the faucet is given just sufficient shock to release the amount of gas required to produce the desired head or foam in the glass.

However, when the cold beer from the coil has been drawn off and the beer flowing from the container reaches the faucet there will be an excessive amount of foam (released carbonic acid gas) due to the fact that this beer has not had time to remain in the coil under pressure to cool and absorb the carbonic acid gas which is separated from the beer leaving the container due to its warm state and rapid reduction of pressure.

In other words, this beer is forced rapidly through the cooling coil leaving the container under the operating pressure and discharging at atmospheric pressure at the faucet. This sudden reduction of the pressure to atmospheric pressure makes it impossible for the free gas to be re-absorbed before reaching the faucet and consequently this system of drawing beer causes un-uniformity of temperature and unevenness of head which is accompanied by waste of beer in an effort to bring about the evenness of head and foam in the glass in which the beer is served.

It is the object of this tapping apparatus to overcome this difficulty and this is accomplished generally by running the beer from the container to the tapping apparatus under counter-pressure with a pressure differential only sufficient to enable the beer to flow through the short line between the beer container and the tapping apparatus.

This does not permit the separation of gas as is the case when beer flows from beer container under operating pressure to the faucet at atmospheric pressure and at a high rate of speed, namely: forty feet for each quart of beer drawn.

The lack of uniformity of temperature is remedied by carrying about two and one-half gallons of beer in the tapping apparatus, this apparatus being submerged in the cooling medium and the cooled beer being drawn from this apparatus to the faucet. Thus as beer is drawn at the faucet the same flows to the tapping apparatus from the beer container to replenish the supply there and maintains the level in the tapping apparatus. This flow takes place at a low pressure differential against a substantial counter-pressure and as the inlet tube is of greater diameter than the coil the flow is ample for maintaining the beer level without a material reduction of pressure in the tapping machine.

The tapping machine is provided with a float mechanism for maintaining the beer level, this float operating a valve to a counter-pressure relief valve which does not permit the counter-pressure to drop below that for which it is set. This relief valve is provided with an alarm whistle which indicates when the beer container is empty and a beer switch is provided for changing to a full container at the moment when the alarm indicates that the container from which beer has been drawn is empty.

In the accompanying drawing:—

Figure 1 is a vertical longitudinal section of a satisfactory embodiment of this invention.

Figure 2 is a top plan view thereof.

Figure 3 is a horizontal section taken on line 3—3 Fig. 1.

Figure 4 is a side elevation, on an enlarged scale, of the key whereby the dispensing apparatus may be rendered inoperative when it is desired to clean the apparatus.

In the following description similar characters of reference indicate corresponding parts in the several figures of the drawing:—

The numeral 10 represents the cooling or refrigerating tank which is adapted to contain or store the liquid on its passage from the main container to the dispensing faucet for the purpose of cooling this liquid before it is served to a customer. The cooling of the liquid within this tank may be effected in any suitable manner but preferably by placing this tank and the parts associated therewith in a box containing cracked ice, which latter is packed around the tank so as to effectively cool the liquid which is temporarily stored within the same after being received from a container and preparatory to being delivered to the dispensing faucet or spigot.

The body of this tank is preferably constructed of thin sheet metal such as copper, and the lower end of this body is provided with a permanent bottom or lower head 11 and the upper end thereof is provided with a removable cover 12 which is detachably connected with the body by means of fastening bolts 13 passing through corresponding lugs 14, 15 secured to the marginal parts of the cover and the upper end of the tank body. A tight joint is produced between this cover and the upper end of the body by means of a packing ring or gasket 16 interposed between the peripheral part of the cover 12, and an upwardly facing shoulder 17 arranged on the upper end of the tank.

The beer or other liquid which is to be cooled may be supplied from a container of any suitable character, for example a barrel, the interior of which is subjected to air pressure so as to expel the liquid therein through the outlet of this container and to the upper inlet end of an inlet pipe 18 which is mounted on the exterior of the tank 10, and has its lower end connected with the interior of the tank between the upper and lower ends thereof, as shown in Fig. 1.

The liquid is discharged from the refrigerating or cooling tank by air pressure during which time this liquid escapes through an outlet pipe 19 which is arranged externally of the tank and is connected at its lower end with the interior of the tank adjacent to the bottom thereof while its upper end is provided with a fitting 20 having an upwardly projecting nozzle 21 which is normally closed by a removable cap 22, and also provided with a plurality of laterally projecting discharge nozzles 23 which are connected with pipes or conduits leading to faucets or valves through which the beer or other liquid is dispensed to customers.

When the apparatus is in operation a counter air pressure is established in the upper end of the tank above the liquid therein, which counter pressure may be initially produced in any suitable manner either by temporarily connecting the tank with another empty beer container which is under pressure or by introducing air or gas under pressure by means of a pump or other means. The air or gas for producing the initial counter pressure in the upper end of the tank is preferably introduced through an air inlet 24 in the cover or upper head of the tank, which air inlet is controlled by means of an air cock or valve 25 which is connected with the air inlet 24 and is closed during the normal operation of the apparatus.

Means are provided for maintaining this counter air pressure in the upper end of the tank so that the beer or other gas-containing liquid which is transferred from the container into this cooling tank will cause the air or gas at the upper end of the tank to be compressed and thereby serve to expel the liquid from the tank when one or another of the dispensing faucets leading from the tank is open for serving liquid to a customer, which controlling means are so organized that this counter pressure may be vented to the atmosphere for the purpose of relieving the counter pressure in case the same becomes excessive during normal operation of the apparatus or when the tank becomes empty.

In its preferred form these counter pressure maintaining and relieving means are constructed as follows:—

From the central part of the underside of the upper head or cover 12 of the tank a tubular nozzle 26 projects downwardly, which nozzle is provided with a central passage 27 leading to the lower end of this nozzle and two upwardly diverging passages 28 leading upwardly into the lower end of a relief inlet chamber 29 which is formed on the upper side of the tank cover 12.

The numeral 30 represents a valve disk which bears with its upper side by means of an intervening packing ring 31 against the lower end of the nozzle 26 and is provided centrally with a relief port 32 and also with a valve seat 33 on its underside around the lower end of this relief port. Within the upper part of the tank is arranged a guiding and supporting cage having two upright arms 35 arranged adjacent to the inner sides of the tank wall 10, a lower cross bar 34 provided centrally with an upright guide opening 36 and an upper cross bar 37 which has a central upwardly projecting collar 38. The latter is connected by means of a screw joint 39 with the lower end of the nozzle 26, and it is also provided with an upwardly facing shoulder 40 which bears against the marginal part of the underside of the valve disk 30 for the purpose of holding the latter against the lower end of the nozzle 26.

The numeral 41 represents a pressure relief valve which is movable vertically toward and from the relief valve seat 33 for the purpose of controlling the port 32. This valve is provided with an upwardly projecting guide stem 42 which is arranged within the port 32 and holds this valve in its proper position with reference to its companion seat.

Within the upper part of the supporting and guiding cage is arranged a supporting cross bar 43, the central part of which has its upper side connected with the valve 41 while its underside is provided with a vertical guide opening 44. Within the lower part of the cage is arranged a vertical movable float 45 which has a lower vertical guide stem or pin 46 sliding in the lower guide opening 36 of the cage, and on its upper side this float is provided centrally with an upwardly projecting guide stem or pin 47 which slides in the central guide opening 44 of the supporting bar 43.

Between the upper side of the float 45 and the lower end of the upper guide stem 47 an annular coupling groove 48 is formed. Above the float 45 and on diametrically opposite sides thereof are arranged two intermediate shifting levers 49, each of which is pivotally connected between its inner and outer extremities by means of a pin 50 with the adjacent outer end of the cross bar 43, while the outer extremity of the respective shifting lever is pivotally connected by means of a pin 51 with the adjacent upright bar of the cage, and the inner end of the same engages with the adjacent part of the groove 48 for the purpose of forming a pivotal connection between this lever and the float.

When the liquid level in the tank 10 is below the normal the float 45 descends and through the medium of the levers 49 and supporting bar 43, causes the relief valve 41 to be moved downwardly away from its seat 33, thereby establishing communication between the upper end of the tank and the relief inlet chamber 29 so as to balance the pressure between the same. As the supply of liquid in the tank is replenished and the level of the same rises, the float in its ascent with the incoming liquid finally closes the relief port 32 by engaging the relief valve 41 with the seat 33 through the medium of the levers 49 and cross bar 43, after which the air or gas in the upper part of the tank is trapped therein and compressed up to the point for which the apparatus has been set due to the discharge of liquid from the container into the cooling tank by producing an air pressure on the liquid in the container by means of a pump or otherwise.

The normal counter pressure of the air or gas in the upper part of the tank, when the relief valve 41 engages its valve seat 33, is about 17 pounds, although this counter pressure may be increased or decreased in order to adapt the apparatus for working under varying conditions.

When the liquid in the tank again drops below its normal level the descent of the float will open the port 32 thereby again establishing communication between the upper end of the tank and the inlet relief chamber 29 and permit any excess air pressure in the tank to escape through the port 32 and thereby allow a normal flow of liquid from the container into the tank until the normal level of the liquid has been reached and the float has been raised sufficiently to again re-engage the relief valve 41 with its seat for closing the relief port 32.

Whenever the air or gas pressure rises above the normal within the cooling or refrigerating tank as usually occurs when the liquid has been completely withdrawn from the tank and no further liquid is supplied to the same from the container, the air pressure within the tank is relieved and permitted to escape to the atmosphere, and while thus escaping the stream of air is utilized to sound a whistle or other alarm for the purpose of warning the attendant that the empty container must be replaced by another full one in order to avoid interruption in the continuity of dispensing the liquid. These relieving and signalling means are preferably constructed as follows:—

Above the relief inlet chamber 29 is arranged a relief outlet chamber 52 which latter is separated from the relief inlet chamber by a flexible diaphragm 53 of rubber or similar material. The marginal part of this diaphragm is clamped between the marginal parts of the walls of the chambers 29 and 52 by means of clamping screws 54 which connect the relief inlet and outlet chambers, as shown in Fig. 1. The central part of the diaphragm 53 is reinforced by a diaphragm backing plate 55 extending over the upper side of the central part thereof.

The diaphragm and its backing plate are secured to each other by an upright tubular bushing 56 passing through the central part of the diaphragm and its plate, and provided on its lower part with a laterally projecting flange or shoulder 57 which engages the underside of the diaphragm 53 and is also provided on its upper part with a clamping screw nut 58 which engages with the central part of the upper side of the backing plate 55.

The upper end of the bushing 53 is provided with a guide stem 59 which slides vertically in a guide opening 60 formed in a tubular collar 61 which projects upwardly from the central part of the wall of the relief outlet chamber 52.

The lower end of the bushing 56 is constructed to form an annular valve 62 from the face of which a relief passage 63 extends upwardly and communicates with the relief outlet chamber by means of branch passages 64 extending laterally from the upper end of the main relief passage 63 to the sides of the guide stem 59 above the clamping nut 58.

Projecting upwardly from the upper head or cover 12 of the tank is a short stud 65 on top of which is arranged a packing 66 forming a seat for the relief valve 63, which latter is movable vertically toward and from the valve seat 66. This packing 66 is held against the upper end of the stud 65 by means of a screw ring 67 having a threaded engagement with the side of the stud 65 and provided with an inwardly projecting flange 68 which overhangs and engages the marginal part of the valve packing 66, as clearly shown in Fig. 1.

The valve 62 is yieldingly held in its depressed position in which it engages with the valve seat 66 by means of a spring 69 arranged within a casing 70 and bears at its lower end through the medium of a button or disk 71 against the upper end of the valve stem 59, while its upper end bears through the medium of a button or disk 72 against the lower end of an adjusting screw 73.

The casing 70 is of tubular form and is connected by means of a screw joint 74 with the exterior of the neck or collar 61 and the adjusting screw 73 is also preferably of tubular form and connected externally by means of a screw joint 75 with the upper end of the spring casing 70. After adjustment the screw 73 is held in place by means of a clamping nut 76 engaging with the external thread of this screw and bearing against the upper end of the spring casing 70.

By turning the adjusting screw 73 in one direction or another the tension of the spring 69 may be increased or decreased and thereby determine the air or gas pressure which is required against the underside of the diaphragm for the purpose of deflecting the latter upwardly and causing the valve 62 to be lifted from its seat so that communication is established between the relief inlet chamber and the relief outlet chamber through the medium of the passages 63 and 64 formed in the bushing 56 and stem 59.

When the valve 62 is lifted from its seat by an excess of air pressure against the underside of the diaphragm some of this air upon passing into the relief outlet chamber escapes through a whistle 77 which is mounted on the wall 52 of the relief outlet chamber and thereby serves as a warning signal to the attendant that replenishing of the supply of liquid which is to be dispensed is necessary.

After a new container filled with liquid has been substituted for the empty container so that the transfer of liquid from the container to the tank through the medium of the pipe 18 has been restored and the liquid level has again risen to normal in the tank, then the further escape of air or gas under pressure from the upper end of the tank 10 into the relief inlet chamber is cut off by the valve 42 and the spring 69 again lowers the diaphragm and closes the relief valve 62, so that no further air or gas escapes from the outer relief chamber to the atmosphere and the blowing of the whistle or similar signal ceases.

When it is desired to expel all the liquid from the tank preparatory to cleaning the same the escape of air through the relief valve is cut off and the sounding of the whistle is prevented. This is preferably accomplished by means of the cleaning key which is shown in Fig. 4 and which comprises an upright screw 78 having a bearing point 79 at its lower end and a handle 80 at its upper end. This cleaning key is screwed into a central opening 81 of the adjusting screw 73 so that the lower bearing end 79 of this key depresses the upper button 72 and produces sufficient tension on the latter to prevent rising of the diaphragm and opening of the relief valve 62 under the greatest pressure which can be brought against the underside of the diaphragm by reason of the discharge of liquid from the container into the cooling or refrigerating tank and the emptying of the latter either through the regular dispensing faucet or into some other vessel provided for that purpose. After the tank has been thus emptied all parts of its interior and the passages connected therewith may be thoroughly cleaned either by water, steam or chemicals, or brushing, or a combination of these methods, and then the apparatus may be again restored to its working condition by again unscrewing and removing the screw 78 so that the outer button 72 again bears against the inner end of the adjusting screw 73.

By thus using a cleaning key which is wholly distinct from the adjusting screw 73 it is possible to definitely adjust the tension of the spring by means of the screw 73 and then leave this screw permanently in this adjusted position and only using the cleaning key for producing unusual pressure on the spring to insure retaining the relief valve in its closed position for emptying the tank preparatory to cleaning the same.

By this means readjustment of the spring is not required after each operation of cleaning the tank and thereby avoids the possibility of faulty adjustment of the spring, which otherwise would be liable to occur.

The interior of the tank and the passages connected therewith are rendered conveniently accessible for cleaning purposes by loosening the screws 13 which permit the removal of the upper head or cover 12 which carries the entire valve mechanism, and also by removing the cap 22 of the outlet pipe 19 so as to enable a brush or other cleaning instrument to be passed down through the outlet pipe 19 and remove any dirt which may have accumulated therein.

By means of this apparatus it is possible to run the beer or other liquid from a container to the tapping apparatus under a counter pressure between which and the pressure on the liquid container there is only sufficient difference to cause the beer to flow through the short conduit or line between the container and the tank of the tapping apparatus and from the tapping apparatus through the dispensing nozzle.

This apparatus therefore does not permit a separation of the gas from the beer to occur as is the case when the beer flows from a container under an operating pressure to the dispensing faucet at atmospheric pressure, and under a high rate of speed which in actual practice is usually about 40 feet for each quart of beer dispensed. The present apparatus therefore assures retention of the gas in the beer and also maintains the beer at a uniformly cool temperature even during rush hours when more beer is drawn than usual, inasmuch as the tank is capable of holding and cooling slowly a considerably larger volume of beer than is possible to cool in a cooling pipe of comparatively small diameter which is capable of only holding a small quantity of beer.

I claim as my invention:—

1. A tapping apparatus comprising a cooling tank adapted to hold a liquid to be dispensed and provided with a liquid inlet, a liquid outlet, and a top provided with an air outlet nozzle, a valve disk engaging the underside of said nozzle and having an air outlet port and a relief valve seat surrounding said port, a cage arranged within said tank and provided on its upper part with a collar secured to said nozzle and engaging with the underside of said valve disk, a relief valve movable toward and from said seat and having a guide stem projecting into said port, a supporting bar having its central part connected with said relief valve, a float arranged within said cage and having upper and lower guide stems guided on said supporting bar and cage and provided with an annular groove, and two shifting levers each pivoted between its ends on one end of said supporting bar and pivoted at its outer end on the cage and engaging its inner end with said groove on the float.

2. A tapping apparatus comprising a cooling tank adapted to hold a liquid to be dispensed and provided with a liquid inlet, a liquid outlet and an air conduit and means for controlling the air pressure in said tank including a float operated valve mechanism adapted to open and close said air conduit, and an air pressure operated valve mechanism adapted to open and close said air conduit beyond said float controlled valve mechanism, and including an inlet air chamber communicating with said tank, an outlet air chamber communicating with the atmosphere, a diaphragm interposed between said chambers, a relief valve for said conduit having a seat on the tank and a closure movable toward and from said seat, a tubular valve stem mounted on said diaphragm and adapted to place said chambers in communication, and spring means for resisting the opening of said relief valve including a tension spring bearing at one end on said valve stem, an adjusting screw bearing against the opposite end of said spring, and a support for said adjusting screw, and means for temporarily increasing the tension on said spring independently of said adjusting screw.

3. A tapping apparatus comprising a cooling tank adapted to hold a liquid to be dispensed and provided with a liquid inlet, a liquid outlet and an air conduit and means for controlling the air pressure in said tank including a float operated valve mechanism adapted to open and close said air conduit, and an air pressure operated valve mechanism adapted to open and close said air conduit beyond said float controlled valve mechanism, and including an inlet air chamber communicating with said tank, an outlet air chamber communicating with the atmosphere, a diaphragm interposed between said chambers, a relief valve for said conduit having a seat on the tank and a closure movable toward and from said seat, a tubular valve stem mounted on said diaphragm and adapted to place said chambers in communication, and spring means for resisting the opening of said relief valve including a tension spring bearing at one end on said valve stem, an adjusting screw bearing against the opposite end of said spring, and a support for said adjusting screw, and means for temporarily increasing the tension on said spring independently of said adjusting screw consisting of a screw key adapted to work through said adjusting screw and to bear against the adjacent end of the tension spring for further compressing the same.

EDWARD ZAHM.